(12) United States Patent
Abatzoglou

(10) Patent No.: US 7,079,072 B1
(45) Date of Patent: Jul. 18, 2006

(54) HELICOPTER RECOGNITION RADAR PROCESSOR

(75) Inventor: Theagenis J. Abatzoglou, Fullerton, CA (US)

(73) Assignee: Raytheon Company, Waltham, MA (US)

( * ) Notice: Subject to any disclaimer, the term of this patent is extended or adjusted under 35 U.S.C. 154(b) by 1826 days.

(21) Appl. No.: 07/012,764

(22) Filed: Jan. 23, 1987

(51) Int. Cl.
*G01S 7/41* (2006.01)

(52) U.S. Cl. .................. 342/90; 342/192; 342/193; 342/196

(58) Field of Classification Search ............. 342/192, 342/193, 89, 90, 98, 99, 101, 196
See application file for complete search history.

(56) References Cited

U.S. PATENT DOCUMENTS 4,400,700 A  *  8/1983  Rittenbach .................. 342/100
4,737,788 A  *  4/1988  Kennedy .................... 342/29
5,376,940 A  * 12/1994  Abatzoglou ................. 342/192

* cited by examiner

*Primary Examiner*—John B. Sotomayor
(74) *Attorney, Agent, or Firm*—John E. Gunther; Leonard A. Alkov; Karl A. Vick

(57) ABSTRACT

A radar processor is disclosed for processing the radar return samples from a Doppler radar receiver to discriminate helicopter targets from fixed-wing targets. The radar processor defines the spectral components of the radar return components due to the helicopter rotor hub as the "signal" component; and the spectral components due to the target skin, ground clutter and white noise as the "noise" component. The radar processor implements the Neyman Pearson criterion to calculate a detection statistic. Whether the calculated detection statistic exceeds a threshold determines whether a "helicopter presents" or a "helicopter absent" target condition is declared. The radar processor utilizes helicopter rotor hub reflected signals, and requires only a few milliseconds on target, and may therefore be readily implemented by scanning surveillance systems.

11 Claims, 4 Drawing Sheets

HELICOPTER RECOGNITION RADAR PROCESSOR

BACKGROUND OF THE INVENTION

The invention relates to Doppler radar, and more specifically to an improved radar signal processing system for discriminating between different aircraft types and ground clutter to identify helicopters.

For certain radar applications, it would be advantageous to be able to identify those targets which represent helicopters. U.S. Pat. No. 4,389,647 discloses a radar system directed to provide this capability. As understood, however, the system disclosed in this patent would not operate as well for low Doppler (i.e., low velocity) helicopters, is not readily applicable to scanning radar systems, and requires relatively long acquisition times to identify a helicopter target.

U.S. Pat. Nos. 4,346,382 and 4,275,396 describe radar systems for detecting helicopters. As understood by applicant, in each of these systems the helicopter detection is accomplished by detecting the modulation induced on the radar return signal by the rotor blades, i.e., detecting the rotor blade flashes. This implies that the required time on target is relatively long, which may prevent use in a scanning surveillance system.

It would therefore represent an advance in the art to provide a radar capable of recognizing helicopter targets within a relatively short acquisition time and which is operable for low Doppler helicopters.

It would further be advantageous to provide a scanning surveillance radar capable of recognizing helicopter targets.

SUMMARY OF THE INVENTION

A Doppler radar system for recognizing helicopter targets from fixed-wing targets is disclosed. The system comprises a radar receiver responsive to radar return signals for providing receiver output signals, and Doppler filter and detection elements for filtering and detecting the receiver output signals to provide target Doppler signals. The system further includes a radar processor responsive to the receiver output signals and the target Doppler signals for providing an indication of the "helicopter present" state.

The radar processor is adapted to analyze the radar return signals on the basis of the two hypotheses, "helicopter present" or "helicopter absent" and to employ the Neyman-Pearson criterion to calculate a detection statistic whose relative magnitude in relation to a threshold determines which of the two hypotheses is declared.

The processor relies on the spectral signature of a helicopter, and particularly the spectral components of the return signal due to modulation and reflection of the transmitted radar pulse by the helicopter rotor hub. These spectral components are declared the "signal" component of the radar return signals. The spectral components of the return signal due to the target skin return, ground clutter and white noise are declared the "noise" components.

The processor determines the autocorrelation matrices for the two hypothesis, "signal plus noise" and "noise only" for the estimated target Doppler frequency. The matrix resulting from the difference between these two matrices is decomposed into its singular values and vectors, i.e., the eigenvalues and eigenvectors. The detection statistic is determined by the sum of the squared magnitude of the inner product of each respective eigenvector with the radar return data vector, weighted by the corresponding eigenvalue. The radar processor typically requires only a few milliseconds on target and can, therefore, be readily implemented into scanning surveillance systems.

BRIEF DESCRIPTION OF THE DRAWINGS

These and other features and advantages of the present invention will become more apparent from the following detailed description of an exemplary embodiment thereof, as illustrated in the accompanying drawings, in which.

DETAILED DESCRIPTION

Figure 1:
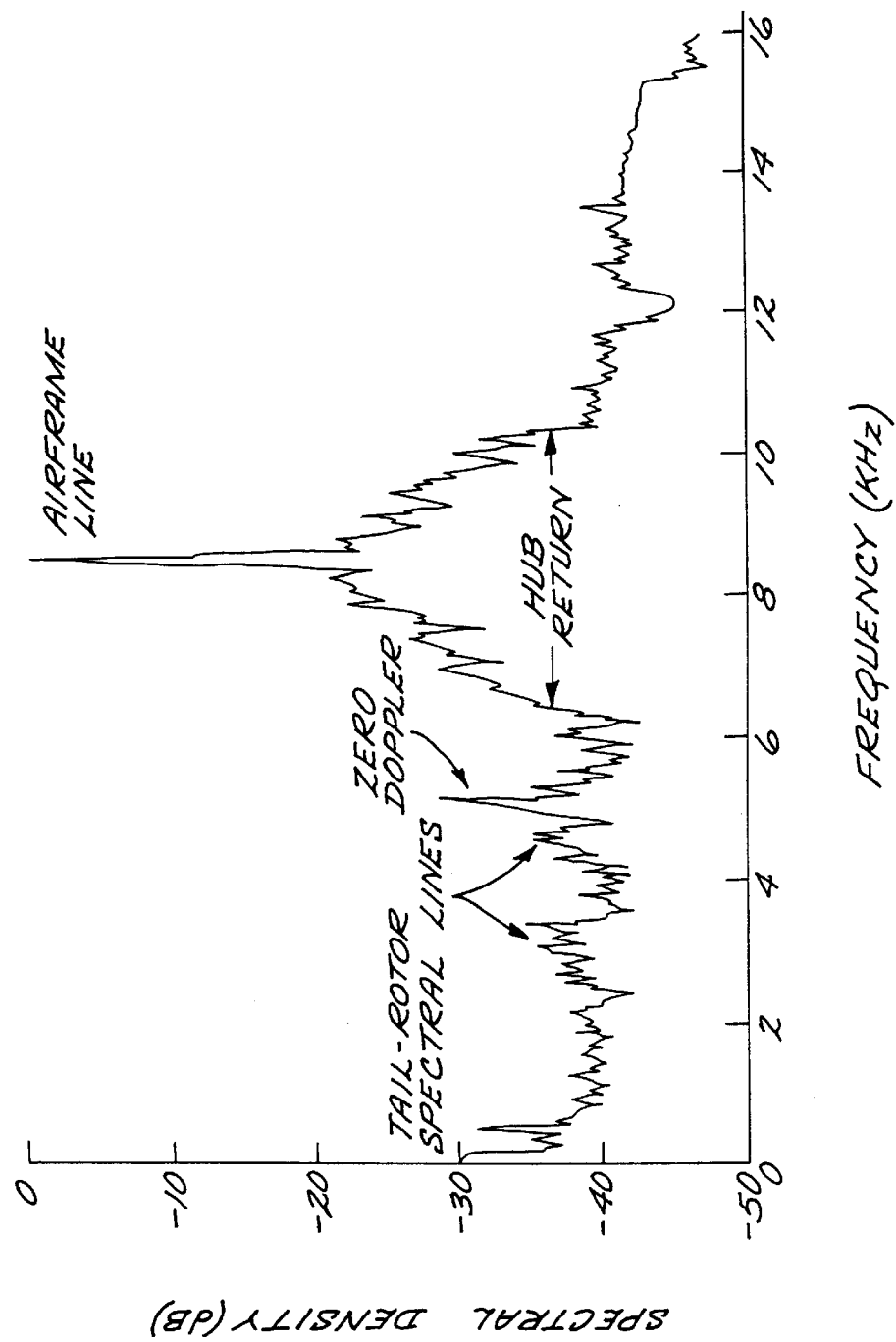
FIG. 1 is a plot illustrative of the power spectral density of a typical helicopter return signal as a function of Doppler frequency, shifted in frequency to illustrate the ground clutter component (at zero Doppler frequency) and the tail rotor return.
Figure 2:
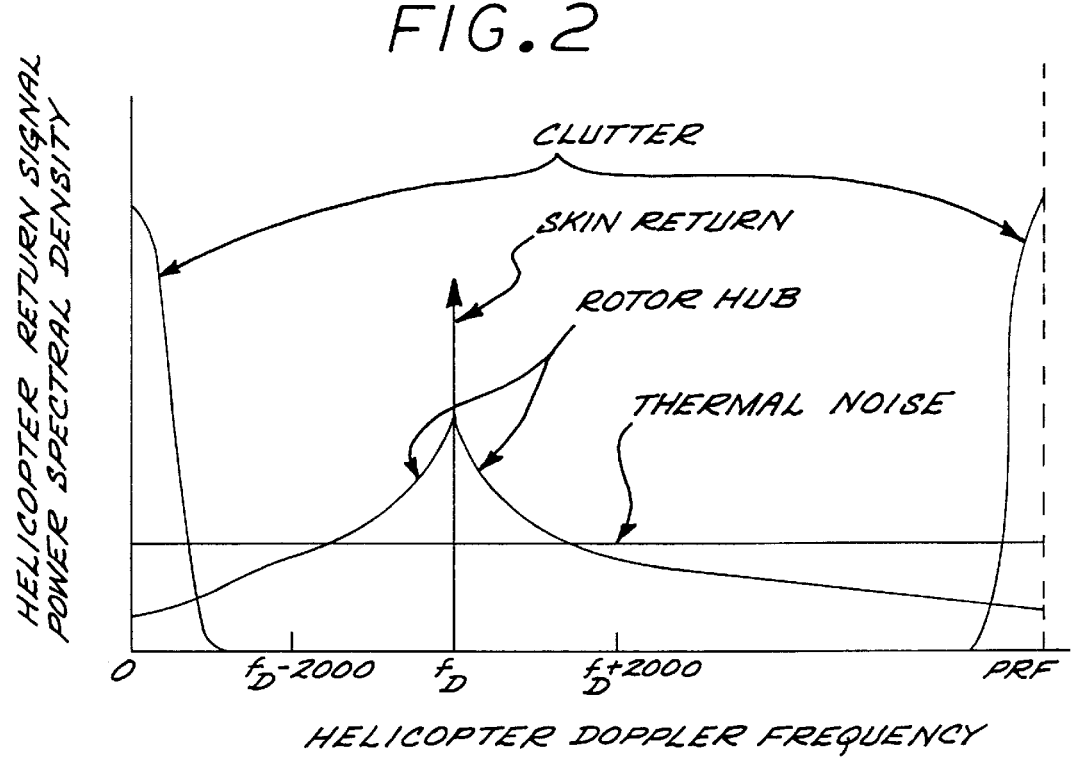
FIG. 2 is a plot of the helicopter return signal power spectral density as a function of the helicopter Doppler frequency.

The invention comprises a radar processor for helicopter/fixed wing target classification, and relies on the spectral signature of the helicopter rotor hub, which has a higher probability of occurrence than the blade flash. FIG. 1 is a plot of the spectral density of a typical helicopter return signal as a function of Doppler frequency, shifted in frequency to illustrate the ground clutter component (at zero Doppler) and the tail rotor return. FIG. 2 is also a plot of the helicopter return signal power spectral density as a function of Doppler frequency, showing the respective skin return, rotor hub, thermal noise and clutter components. The helicopter skin return peaks at Doppler frequency $f_D$ with the rotor hub return comprising sidebands about $f_D$. The ground clutter peaks at sidebands well away from $f_D$. The thermal noise is shown in FIG. 2 as having a constant value.

The invention exploits the fact that the helicopter rotor hub reflects a considerable amount of the electromagnetic energy with which it is illuminated by the radar system. The total power reflected from the rotor hub is typically within 5 to 10 dB of the power reflected by the helicopter body structure or skin. In contrast, the power reflected by the rotor blades is typically less than 1% of the total reflected power. Moreover, typically 50% of the rotor hub return is spectrally located within 300 Hz of the skin return Doppler frequency, and 99% is contained within the 2000 Hz band centered at the target skin return Doppler frequency.

Signal Models

Consider N complex-valued baseband samples ($x_n = I_n + jQ_n$) of a radar return signal collected from a target, which may be either a fixed-wing target or a helicopter, wherein $n = 1, 2 \ldots N$. For the "fixed wing" target hypothesis $H_o$, these N samples can be modeled as:

$$x_n = z_n e^{2\pi j n T f_D + v_n} + c_n. \tag{1}$$

For the "helicopter" target hypothesis $H_1$, the N samples $x_n$ may be modeled as:

$$x_n = h_n + z_n e^{2\pi j n T f_D} + c_n + v_n \tag{2}$$

where:

T=the radar inter-pulse period (IPP)

$f_D$=target doppler frequency;

$V_n$=complex gaussian white noise of zero mean;

$C_n$=ground clutter samples from a zero mean gaussian random sequence of known autocorrelation (the power spectrum of the clutter return is very narrow and centered about $f_D$=0);

$z_n$=target's complex envelope (skin return) samples, again taken as a zero mean complex gaussian sequence whose power spectrum is narrow and centered about $f_D$=0; and $h_n$=return samples from helicopter rotor hub, which can be considered as a zero mean complex gaussian random sequence of known power spectrum.

The random variables $(z_n)$, $(c_n)$, $(h_n)$, and $(v_n)$ are all taken to be uncorrelated.

The element value of the autocorrelation matrix $Q_{s+w}$ of the return "signal plus noise" at the kth row and mth column is defined by Equation 3:

$$(Q_{s+w})_{k,m} = R_h(k-m) + (e^{2\pi j(k-m)T/D})R_Z(k-m) + (N_o/2)\delta_{km} + R_c(k-m) \quad (3)$$

and the corresponding element values of the autocorrelation matrix $Q_w$ of the "noise" is defined by Equation 4, $$(Q_w)_{k,m} = (Q_{s+w})_{k,m} - R_h(k-m) \quad (4)$$

where:

$R_h$ is the rotor hub autocorrelation sequence;

$R_Z$ is the target skin autocorrelation sequence for the stationary target ($f_D$=0);

$R_c$ is the ground clutter autocorrelation sequence;

$N_o/2$ is the power of white noise; and $\delta_{km}$ a delta function which is unity if k equals m, and zero if k does not equal m.

As is well known to those skilled in the art, the respective autocorrelation sequences $R_h$, $R_Z$, $R_c$ can be obtained as the inverse Fourier transform of the corresponding power spectral density. The power spectral density $S_H(f)$ of the rotor hub return may be modeled as $$S_H(f) = C(10^{-(A/10)|f-f_D|}) \quad (5)$$

where an exemplary value selected for the constant A is 0.006, and C is a constant chosen so that the rotor hub return power is equal to one tenth of the target skin return power per pulse.

The value of A affects the rate of decay of the rotor hub return power as the frequency f departs from the target Doppler frequency; the particular value selected for A is consistent with measured data of the returns from a helicopter target. The target skin power spectral density is modeled as a rectangle centered about the Doppler frequency $f=f_D$ and of total width of about 1/25 PRF (pulse repetition frequency). The ground clutter is assumed to have a gaussian shape power spectral density with a standard deviation of about 20 $H_z$ at X-band.

With the respective rotor hub, target skin and ground clutter spectral power densities determined, the corresponding autocorrelation sequences $R_h$, $R_z$, $R_c$ can be obtained as the respective inverse Fourier transform of these spectral power densities, and the autocorrelation matrices $Q_{s+w}$ and $Q_w$ can be calculated using Eqs. 3 and 4.

Helicopter Detection Signal Processing

The N return samples $x_n$ from the target may be considered a data vector X. In accordance with the invention, the Neyman-Pearson criterion (likelihood ratio) is applied to the data vector X based on the possible hypotheses of the fixed wing target, hypothesis $H_o$, and the helicopter target, hypothesis $H_1$. The Neyman-Pearson criterion is well known to those skilled in the art, and, for example, is discussed in "Detection, Estimation and Modulation Theory," Part I, H. L. Van Trees, N.Y.-Wiley, 1970. The sufficient detection statistic in this case is $$y = -\ln \Lambda(X) \quad (6)$$

where $\Lambda(X) = p(X|H_1)/p(X|H_o)$; and $p(X|H)$=probability density of the vector X for the given hypothesis $H_o$ or $H_1$.

The detection statistic y may also be written as $$y = X^*(Q_{s+w}^{-1} - Q_w^{-1})X \quad (7)$$

where $X^*$ represents the conjugate of the data vector X, and $Q_{s+w}$ and $Q_w$ are the respective autocorrelation matrices of the "signal plus noise" and "noise" only. The helicopter recognition algorithm may be generally written as $$y \underset{H_1}{\overset{H_O}{\gtrless}} \text{Threshold,} \quad (8)$$

Thus, if y is greater than the threshold value, which is a function of the target-skin-return-to-noise ratio (SRNR) then hypothesis $H_o$ (fixed wing) is declared true, and if y is less than the threshold, hypothesis $H_1$ (helicopter) is declared true.

Performance Analysis

The performance of the algorithm of Eq. 8 may be analyzed in the following manner. It may be shown that $(Q_{s+w}^{-1} - Q_w^{-1})$ is a Hermitian negative definite matrix. The noise autocorrelation matrix $Q_w$ may be factored, using the Cholesky decomposition, as $Q_w = M_w M_w^*$, where $M_w$ represents a lower diagonal matrix, "Matrix Computations," by G. Golub and C. Van Loan, The John Hopkins University Press, 1983, at page 89. The vector V (the sequence $v_n$) is defined as $V = M_w^{-1} X$. Then, the value of the detection statistic for the fixed wing hypothesis $H_o$ may be written as:

$$y|H_O = \sum_{n=1}^{N} \lambda_n |v_n|^2 \quad (9)$$

where $\{\beta_n\}$=eigenvalues of $M_w^*(Q_{s+w}^{-1} - Q_w^{-1})M_w$, i.e. $\lambda_n < o$. The values $v_n$ are zero mean complex independent gaussian random variable of equal variance. It follows that the probability density of the detection statistic for the fixed wing target hypothesis being declared true may be written as:

$$p_y|H_O(y) = -\sum_{n=1}^{N} (a_n e^{-y/\lambda_n})/\lambda_n \quad (10)$$

$$a_n = \prod_{\substack{k=1 \\ k \neq n}}^{N} (1/(1 - \lambda_k/\lambda_n));$$

Similarly, the probability density of the detection statistic for the helicopter hypothesis $H_1$ may be written as:

$$p_y|H_1(y) = -\sum_{n=1}^{N}\left(a'_n e^{-y|\lambda'_n}\right)/\lambda'_n \qquad (11)$$

where $$a'_n = \prod_{\substack{k=1\\k\neq n}}^{N}(1/(1-\lambda'_k/\lambda'_n));$$

$\{\lambda'_n\}$ = eigenvalues of $M_{s+w}^*(Q_{s+w}^{-1}-Q_w^{-1})M_{s+w}$;
$Q_{s+w} = M_{s+w}M_{s+w}^*$; and
$M_{s+w}$ = lower diagonal matrix With these parameters defined, the performance of the Neyman-Pearson radar processor embodying the invention is characterized by the following relationships defining the probability of false alarm ($P_{FA}$ and probability of detection ($P_D$):

$$P_{FA} = -\sum_{n=1}^{N} a_n e^{-\eta/\lambda_n} \qquad (12)$$

$$P_D = -\sum_{n=1}^{N} a'_n e^{-\eta/\lambda_n^g} \qquad$$

where the detection decision criterion is given by Eq. 8 and n represents the threshold value.

Implementation of the Helicopter Recognition Algorithm

An exemplary implementation of the helicopter recognition algorithm employing the Neyman-Pearson criterion will now be discussed. This implementation makes use of the Schur decomposition of matrices, a well known matrix decomposition known in matrix computations. The Schur decomposition is described, for example, in the book Matrix Computations, by G. Golub and C. Van Loan, the John Hopkins University Press, 1983, at pages 192–195.

Consider the Schur decomposition of $$Q_{s+w}^{-1} - Q_w^{-1} = U^*SU \qquad (14)$$

where the matrix U, representing the N eigenvectors $U_i$ of $(Q_{s+w}^{-1}-Q_w^{-1})$, is unitary, i.e., $U^*U=UU^*=1$, $$S = \begin{bmatrix} \sigma_1 & & o \\ & \sigma_2 & \\ o & & \sigma_N \end{bmatrix}, \text{ and}$$

$\sigma_i$ represents the eigenvalues of $Q_{s+w}^{-1}-Q_w^{-1}$ of decreasing magnitude with increasing i.

Only a few eigenvalues (K of them) carry any significance, i.e., the magnitude of $\sigma_i$ is much less than $\sigma_1$ if i is greater than K and K is much less than N. Assume that the vector $U_i$ represents the ith row of the matrix U. Then the decision criteria may be written as $$y \simeq \sum_{i=1}^{K} \sigma_i |U_i X|^2 \underset{H_1}{\overset{H_O}{\gtrless}} \eta \qquad (15)$$

The matrix U resulting from the Schur decomposition of $(Q_{s+w}^{-1}-Q_w^{-1})$ is comprised of N orthogonal vectors $U_i$, i.e., the N eigenvectors. Thus, the decomposition may be viewed as decomposing the matrix $(Q_{s+w}^{-1}-Q_w^{-1})$ into its N principal orthogonal vector components. Each orthogonal vector $U_i$ may be viewed as a set of filter coefficients, and the N eigenvalues $\sigma_i$ may be viewed as a set of weight factors.

Figure 3:
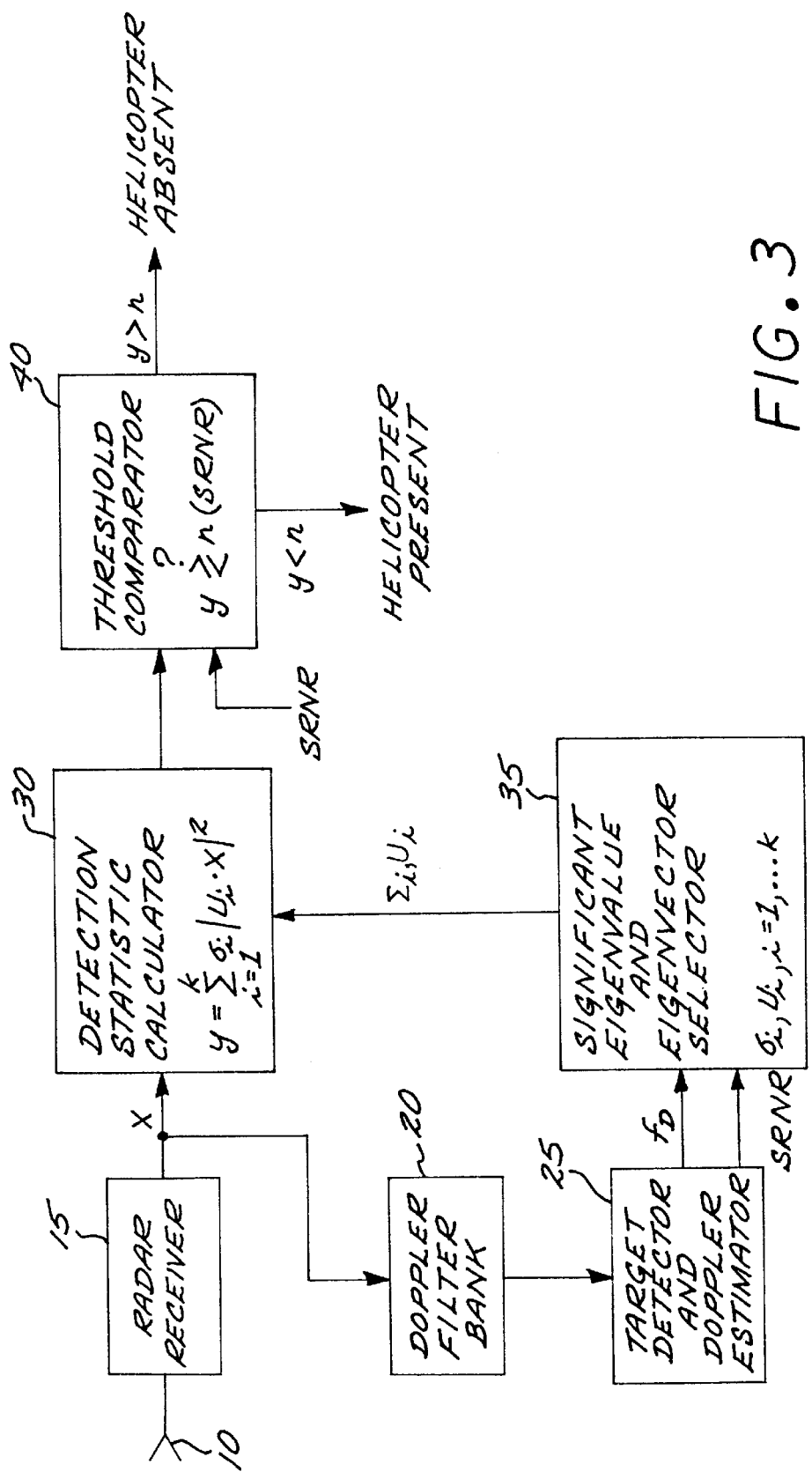
FIG. 3 is a block diagram of a radar processor employing the invention.

Exemplary Implementation of Radar Processor A block diagram of a radar processor embodying the invention is depicted in FIG. 3. The N return samples $x_n$ forming the input data vector X are provided as an input to processor block 20 from radar receiver 15 and antenna 10. The vector X is a one-dimensional, N column matrix representing the N samples $x_n$.

The input data vector is also coupled to Doppler filter bank 20, whose output is processed by target detector and Doppler estimator 25. Detector and estimate provides the functions of appropriately declaring that a target has been detected, estimating its Doppler frequency and providing signals to selector 35 indicative of the estimated Doppler frequency $f_D$ and the measured target skin return to noise power ratio (SRNR).

The Doppler filter bank 20 may preferably be implemented by the operation of a digital computer processing the input data sequence $x_n$, with each filter being characterized by a set of filter coefficients. The coefficients of each filter in the bank 20 are selected so that each respective filter responds to target return signals from a target having a particular Doppler frequency. The respective magnitudes of the outputs of all the filters in the bank 20 may be compared to determine the filter having the largest output, and the Doppler frequency $f_D$ to which this filter is responsive may be selected as the estimated target Doppler frequency $f_D$.

The target skin return to noise power ratio may be measured by target detector and Doppler estimator 25. The power output, i.e., the squared magnitude $D^2$ of the Doppler filter having the maximum response to the data sequence $x_n$ is employed, with the noise power and the particular Doppler filter coefficients $b_n$. The noise power is known, since that is generally a function of the receiver noise level and is characterized by the sample noise variance $\mu^2$. The target skin return to noise power ratio (SRNR) may be written as $$SRNR = D^2 / \left(\mu^2 \left|\sum_{n=1}^{N} b_n\right|^2\right) \qquad (16)$$

The target skin return power (TSP) per pulse may be written as $$TSP/pulse = D^2 / \left(\left|\sum_{n=1}^{N} b_n e^{2\pi jnf_D T}\right|^2\right) \qquad (17)$$

Radar receiver 15, detector 25 and filter bank 20 are conventional elements, and need not be described in further detail.

Once a target has been detected, calculator 30, selector 35 and comparator 40 provide the function of discriminating whether the target is a fixed wing craft or a helicopter.

Selector 35 performs the function of selecting or calculating the K significant eigenvalues and corresponding eigenvectors ($\sigma_i$, $U_i$) to be used for the target type discrimination. This selection or calculation is dependent on the estimated target Doppler frequency $f_D$ which information is provided to selector 35 by target detector and Doppler estimator 25. Thus, once a target is detected, its estimated Doppler frequency is provided to selector 35.

$\sigma_i$ and $U_i$ represent the eigenvalues and corresponding eigenvectors of the Schur decomposition of the matrix computation $(Q_{s+w}^{-1} - Q_w^{-1})$ as described above with respect to Eq. 14. The autocorrelation matrices $Q_{s+w}$ and $Q_w$ depend in general on the Doppler frequency $f_D$ of the target skin return, the power spectral density of the clutter present, and the power spectral density of other noise and interference sources, such as thermal noise and chaff (Eqs. 3 and 4). Hence, there will be different resulting autocorrelation matrices for each target Doppler frequency value $f_D$. The eigenvalues $\sigma_i$ and corresponding eigenvectors $U_i$ for each Doppler frequency may be computed in advance and stored in a look-up memory table. By way of example, the expected Doppler frequency range can be subdivided into a plurality of sub-bands, with each sub-band represented by a median Doppler frequency value. Thus, the expected Doppler frequency range is represented by a plurality of discrete values $f_D$.

The particular noise autocorrelation matrix $Q_w$ employed for each Doppler frequency value $f_D$ is determined by the particular discrete Doppler $f_D$ and use of empirical data or assumptions characterizing the expected target-skin-return-to-noise-power ratio and the expected power spectral density of other noise and interference sources. The particular signal-plus-noise autocorrelation matrix is determined by utilization of the same empirical data or assumptions, as well as empirical data gleaned from the spectral characteristics of the radar return signals for the respective $f_D$ values for helicopter targets. Equations 3–5 may be used to calculate these autocorrelation matrices. Given the power spectral densities of the rotor hub return, the target skin return, the ground clutter and white nose, the autocorrelation matrices may be readily calculated. Exemplary signal models for each of these variables is given above with respect to the discussion of Equations 3–5.

The size of the matrix resulting from the operation $Q_{s+w}^{-1} - Q_w^{-1}$ is N×N, where N represents the number of radar return samples. There are many known computational techniques for determining the eigenvalues and corresponding eigenvectors; one technique is discussed in *Matrix Computations*, id., and another technique is the Power Method described in *The Theory of Matrices in Numerical Analysis*, by Alston Householder, Dover Publications, 1964.

The selector 35 employs the estimated target Doppler $f_D$ as a look-up table pointer to address the appropriate table memory locations in which the eigenvalues $\sigma_i$ and corresponding eigenvectors $U_i$ calculated for the particular $f_D$ value are stored. These values may in turn be provided to the detection statistic calculator 30.

To minimize the computational burden on the radar processor, only the most significant eigenvalues (k of them) and eigenvectors are selected, as described above. For example, analysis indicates that, for the case where the number of data samples N=14, selecting K=4 will provide acceptable detection performance for many applications. The number K may be predetermined. The significant eigenvalues carry all significant information about the "signal" component of the radar returns, while the remaining eigenvalues carry predominately information about the "noise" component of the radar return.

The selection of the eigenvalues and eigenvectors could also be made dependent on the particular target skin return to noise power ratio (SRNR) value calculated for the particular target. For example, one group of sets of eigenvalues and eigenvectors may be calculated in advance and stored for targets having a SRNR value in the range of 0–10 dB, another group stored for targets having an SRNR value in the range of 10–20 dB, and so on.

The detection statistic calculator 30 performs the summation $$y = \sum_{i=1}^{K} \sigma_i |U_i X|^2,$$

where the respective values for $\sigma_i$ and $U_i$ are those provided by the selector 35 for the particular target Doppler frequency. The value of the detection statistic is provided to threshold comparator 40.

At threshold comparator 40, the particular detector threshold value n for the assumed or calculated skin-return-to-noise-power ratio is compared against the value of the detection statistic y to determine whether the "helicopter absent" or helicopter condition is declared. If the value of y exceeds the threshold, the "helicopter absent" condition is declared. If the value of y is less than the threshold, the "helicopter present" condition is declared.

The particular value for the detection threshold may be computed implicitly as a solution to the relationship (Eq. 12) for the probability of false alarm PFA where the probability PFA is selected and the values for the autocorrelation matrices $Q_{s+w}$ and $Q_w$ are determined using estimates of the power spectral densities of the thermal noise, target skin return, rotor hub return, and clutter.

The radar processor shown in FIG. 3 may be characterized as performing the following steps to discriminate helicopter targets:

1. Receive the sequence of N samples $X_n$ of the data signal X.
2. Detect the presence of a target, estimate its Doppler frequency $f_D$ based on the radar return samples and calculate the target skin return to noise power ratio.
3. From the estimated target Doppler frequency and target skin return to noise power ratio, determine the respective autocorrelation matrices $Q_{s+w}$ and $Q_w$ for the "signal plus noise" and "noise only" conditions, where the signal is defined as the helicopter rotor hub return, and "noise" is defined as the target skin return, ground clutter, white noise and other true noise contributions.
4. Decompose the matrix $(Q_{s+w}^{-1} - Q_w^{-1})$ into its N principal orthogonal components; i.e., determine the N eigenvalues and corresponding eigenvectors.
5. Compute the detection statistic y, based on the radar return signals and the eigenvalues and corresponding eigenvectors. This may be viewed as summing the weighted samples $x_n$ which are processed through the respective filters comprising each eigenvector.
6. Compare the magnitude of the detection statistic against a predetermined threshold to declare either the "helicopter present" or "helicopter absent" condition.

The performance of the radar processor characterized by the disclosed algorithm is relatively insensitive to changes in the skin-return-to-noise level and the clutter-return-to-noise level, and is somewhat sensitive to variations in the number of processed pulses N and the target Doppler frequency. Thus, for a particular application, it may be appropriate to eliminate the calculation of the target skin-return-to-noise-power ratio and instead simply use a group of eigenvalues and eigenvectors based on some assumed value for this parameter.

Figure 4:
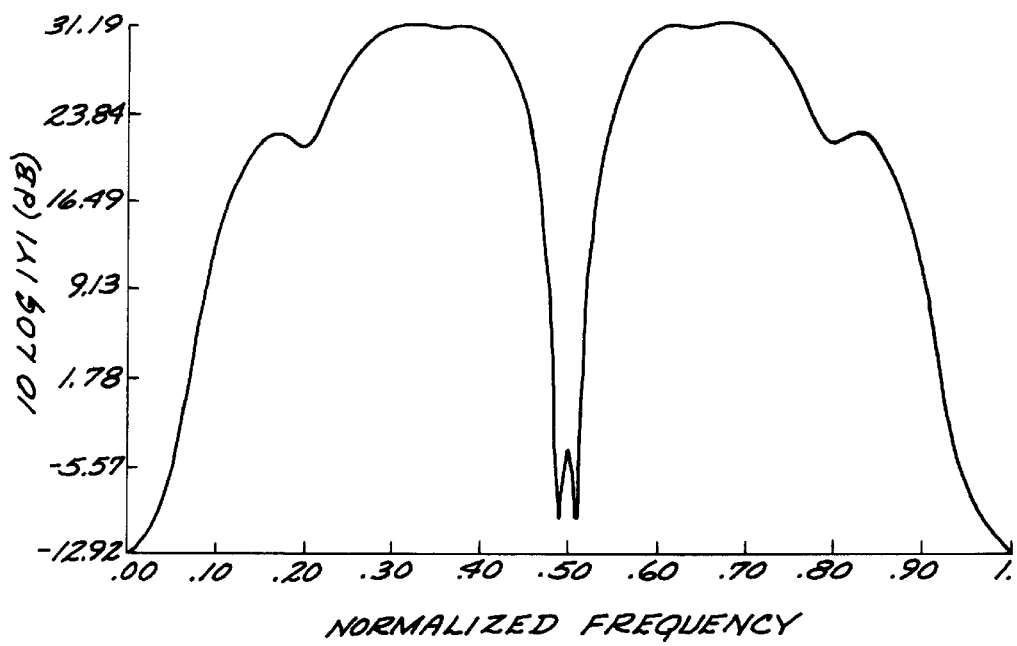
FIGS. 4 and 5 are normalized frequency response graphs, plotting the magnitude of the algorithm detection statistic as a function of normalized Doppler frequency, for two normalized target Doppler frequencies, 0.5 and 0.3, respectively.
Figure 5:
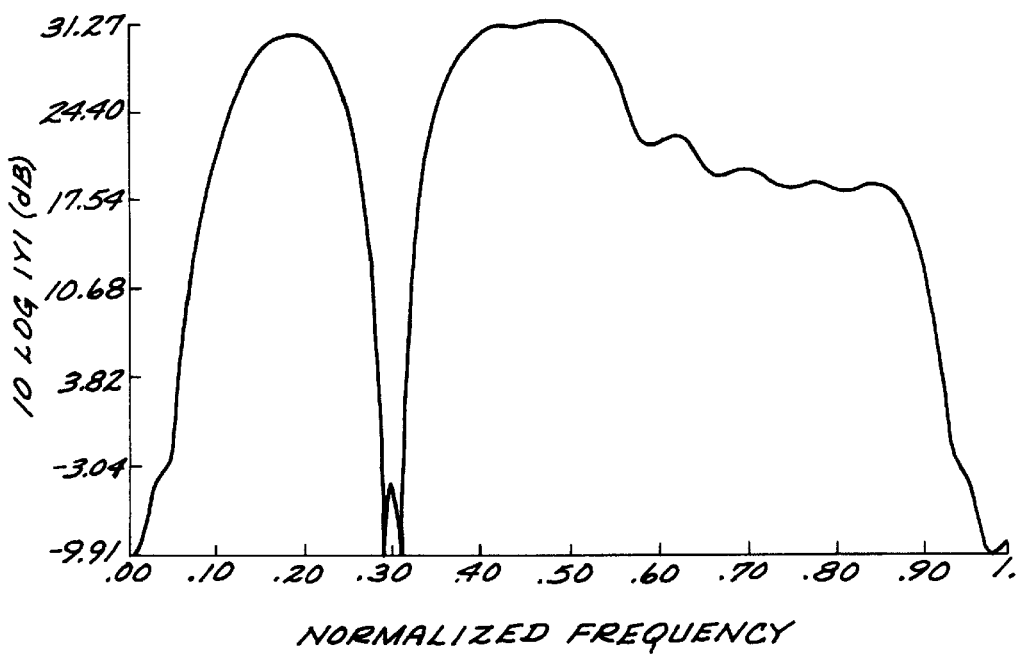

FIGS. 4 and 5 are graphs plotting the frequency response of the absolute value of the detection statistic y (in dB) for two exemplary target Doppler frequencies, normalized to the receiver sampling rate. For the graph of FIG. 4, the normalized target Doppler frequency is 0.5, and for the graph of FIG. 5, the normalized target Doppler frequency is 0.3. The detection statistic y here is calculated as follows:

$$y = \sum_{i=1}^{N} \sigma_i |U_i e(f)|^2,$$

where $e(f)=(1, \exp(2\pi j f), \ldots, \exp(2\pi j(N-1)f))^T$ and N is selected to be 15. For each calculation, the target-skin-return-to-noise power ratio and the clutter-return-to-noise-power ratio are each assumed to be 20 dB and the clutter bandwidth is 0.03.

The detection statistic y is defined as a negative number (Eq. 6); the threshold n is also a negative number. It is apparent from comparison of the exemplary plots of FIGS. 4 and 5 with the spectral power densities of a helicopter radar return as shown in FIGS. 1 and 2 that the absolute value of the detection statistic y will be relatively small if the power of the target return is substantially confined to a small spectral sub-band centered at the target Doppler frequency, as is the case for fixed wing targets. This small absolute value of the detection statistic is due to the sharp notch in the frequency response of the detection statistic at the target Doppler frequency. On the other hand, because the helicopter rotor hub return power has substantial power components over a several hundred hertz range about the target Doppler frequency, the absolute values of the detection statistic for the helicopter target will be relatively large. Since the detection algorithm compares the negative value of the detection statistic against a negative valued threshold, a small absolute value of the detection statistic y results in the declaration of the "helicopter absent" condition when it is smaller than the absolute value of the threshold. When considering the signed values, then this condition is declared when the value of the detection statistic is larger than the threshold. Conversely, the "helicopter present" condition will be declared when the value of the detection statistic is smaller than the threshold, i.e., when the absolute value of the detection statistic is greater than the Tt absolute value of the threshold.

It is understood that the above-described embodiment is merely illustrative of the possible specific embodiments which may include principles of the present invention. Other arrangements may be devised in accordance with these principles by those skilled in the art without departing from the scope of the invention.

What is claimed is:

1. A Doppler radar for discriminating detected targets as either helicopter targets or fixed-wing targets, comprising:

a Doppler radar receiver for providing a sequence of N radar return data signal samples;

means responsive to said sequence of return data signals for detecting the presence of a target, estimating its Doppler frequency and providing an estimate signal indicative of said estimated target Doppler frequency;

a radar processor responsive to said Doppler frequency estimate signal, said processor comprising means for providing a plurality of sets of filter coefficients, means for processing said sequence of radar return data signals by each of said respective sets of filter coefficients to provide a plurality of filtered data sequence signals, and means for summing the squared magnitudes of the respective filtered data sequence signals to provide a processor detection statistic signal;

each of said sets of filter coefficient sets being selected to pass components of said radar return signals resulting from a helicopter rotor hub and to substantially reject components of said radar return signals resulting from the target skin and ground clutter; and means for comparing said processor detection statistic signal to a predetermined threshold value to provide a target discrimination signal having a first state indicative of the "helicopter present" state and a second state indicative of the "helicopter absent" state, the particular state of said target discrimination signal depending on whether or not said threshold value is exceeded.

2. The Doppler radar of claim 1 wherein said means for providing said plurality of sets of filter coefficients comprises:

(i) means for providing the matrix $(Q_{s+w}^{-1}-Q_w^{-1})$ where $Q_{s+w}$ represents the autocorrelation matrix of "signal plus noise" and $Q_w$ represents the autocorrelation matrix of "noise," wherein the "signal" is defined as the component of the radar return signal resulting from the helicopter rotor hub, and the "noise" is defined as comprising the components of the radar return signal resulting from the target skin, ground clutter, and white noise; and (ii) means for providing at least the K most significant eigenvalues and corresponding eigenvectors of said matrix $(Q_{s+w}^{-1}-Q_w^{-1})$ the elements of each respective eigenvector $u_i$ comprising a corresponding one of said sets of filter coefficients, and said respective eigenvalues $\sigma_i$ comprising a weighting coefficient for the corresponding set of coefficients.

3. The Doppler radar of claim 2 wherein said means for processing said radar return signals by said respective sets of filter coefficients comprises means for performing the computation $$y = \sum_{i=1}^{K} \sigma_i |U_i X|^2$$

where y represents said processor detection statistic signal, $\sigma_i$ represents the respective ith eigenvalue, $U_i$ represents the respective ith eigenvector, X represents the sequence $x_n$ of radar return signal samples, and K is an integer less than N.

4. The Doppler radar of claim 3 wherein the value K is predetermined in dependence on the number of data samples N.

5. The Doppler radar of claim 2 wherein the expected target Doppler frequency range is divided in a plurality of sub-bands, with a respective discrete Doppler frequency within each sub-band representing said sub-band, and wherein said respective "signal plus noise" and "noise" autocorrelation matrices are calculated in advance for each discrete Doppler frequency value and stored in a processor memory for recall in dependence on said estimated target Doppler frequency.

6. A method for processing Doppler radar return signals to discriminate between fixed-wing aircraft targets and helicopter targets, comprising a sequence of the following steps:

a) providing a sequence of N samples of the radar return signals, which sequence forms a data vector;

b) detecting the presence of a target and estimating its Doppler frequency $f_D$ from said data vector;

c) when a target is detected, determining estimates of the respective autocorrelation matrices $Q_{s+w}$ and $Q_w$ for the two target conditions, "signal plus noise" and "noise only, where the "signal" is defined as the radar return from the helicopter rotor hub and "noise" is defined as comprising the target skin return, ground clutter and white noise components for a target of said estimated Doppler frequency;

d) decomposing the matrix $(Q_{s+w}^{-1} - Q_w^{-1})$ into its orthogonal vector components;

e) computing detection statistic value y by processing said data vector through at least K of said vector components in accordance with the algorithm $$y = \sum_{i=1}^{K} \sigma_i |U_i X|^2,$$

where $U_i$ represents said respective orthogonal vector components, the $\sigma_i$ represents a set of weighting coefficients and K is a predetermined integer value less than N; and f) comparing the magnitude of the detection statistic y against a predetermined threshold to declare either the "helicopter present" or helicopter absent" condition, depending on whether the magnitude of the detection statistic exceeds the threshold.

7. The method of claim 6 wherein said step of decomposing said matrix comprises the eigenvalue decomposition of said matrices into its eigenvalues $\sigma_i$ and its corresponding eigenvectors $U_i$.

8. The method of claim 6 wherein the expected target Doppler frequency range is divided into a plurality of sub-bands, and wherein said estimate signal resulting from said step (b) is indicative of the particular Doppler sub-band in which the estimated target Doppler frequency is located.

9. The method of claim 8 wherein said step of determining estimates of said respective autocorrelation matrices comprises:

(i) calculating respective ones of said autocorrelation matrices in advance for each Doppler frequency sub-band; and (ii) based on the estimated target Doppler frequency, selecting the respective calculated matrices corresponding to the Doppler frequency sub-band in which the estimated target Doppler frequency is located.

10. The method of claim 9 wherein said step (d) of decomposing said matrix comprises:

(i) for each "signal plus noise" and "noise" autocorrelation matrix calculated in advance for each Doppler frequency sub-band, decomposing said matrice $(Q_{s+w}^{-1} - Q_w^{-1})$ into its eigenvalues $\sigma_i$ and corresponding eigenvectors $U_i$ and storing said eigenvalue and corresponding eigenvector corresponding to each Doppler frequency sub-band in a processor memory, said respective eigenvectors corresponding to said orthogonal vector components; and (ii) when a target has been detected and its Doppler frequency estimated, withdrawing from processor memory the respective eigenvalue and eigenvector corresponding to the Doppler frequency sub-band in which the estimated target Doppler frequency is located.

11. The method of claim 6 wherein said step (b) further comprises estimating the target skin-return-to-noise-power ratio (SRNR), and wherein said step (c) of determining estimates of said respective autocorrelation matrices employs said estimated ratio and said estimated target Doppler frequency in determining said respective correlation matrices.

* * * * *